United States Patent

[11] 3,588,650

| [72] | Inventor | Jeffrey M. Bevis |
| | | Long Beach, Calif. |
| [21] | Appl. No. | 862,609 |
| [22] | Filed | Sept. 5, 1969 |
| [45] | Patented | June 28, 1971 |
| [73] | Assignee | Chalco Engineering Corporation |
| | | Gardena, Calif. |

[54] VARIABLE FREQUENCY MOTOR DRIVE
3 Claims, 9 Drawing Figs.
[52] U.S. Cl............................................ 318/227,
318/230, 318/231, 318/341
[51] Int. Cl............................................. H02p 5/40
[50] Field of Search............................................ 318/138,
171, 227, 230, 231, 341

[56] References Cited
UNITED STATES PATENTS
3,290,573  12/1966  Kamens.................. 318/171
3,365,638  1/1968  Risberg.................. 318/231X
3,512,067  5/1970  Landau.................. 318/231X Primary Examiner—Gene Z. Rubinson
Attorney—Julius L. Rubinstein ABSTRACT: The speed of an AC motor can be controlled by varying the input frequency and voltage supplied to the motor. The invention is characterized by a solid-state switch bridge connected to the electric motor for supplying generally square wave voltage pulses to the motor at the desired frequency. The square voltage pulses are chopped to adjust the average voltage supplied to the motor to maintain the constant torque characteristic required for the input frequency to the motor. An RC attenuating circuit is connected to the motor in such a way that when the frequency is changed the regulated level of the average motor voltage is automatically changed to a value which maintains the torque in the motor substantially constant.

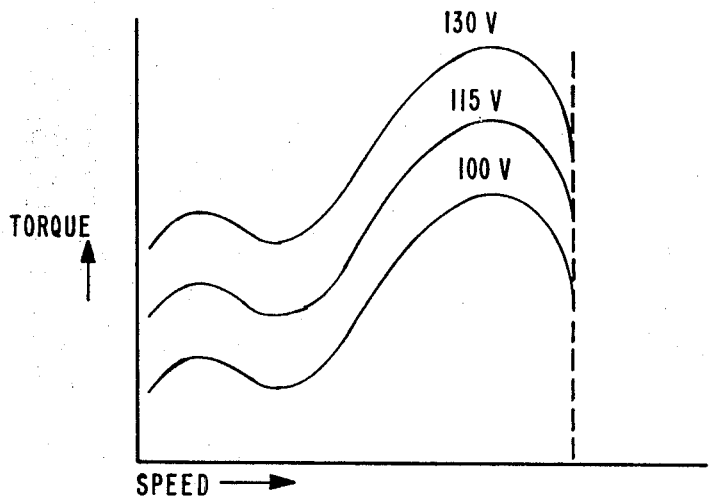
FIG.—1
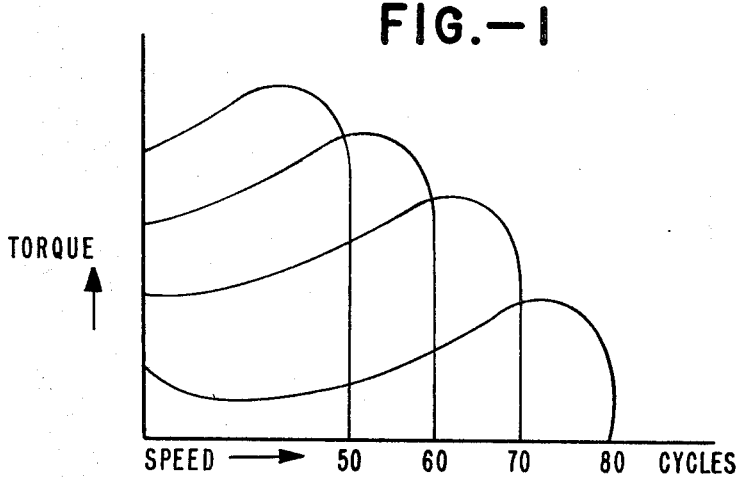
FIG.—2
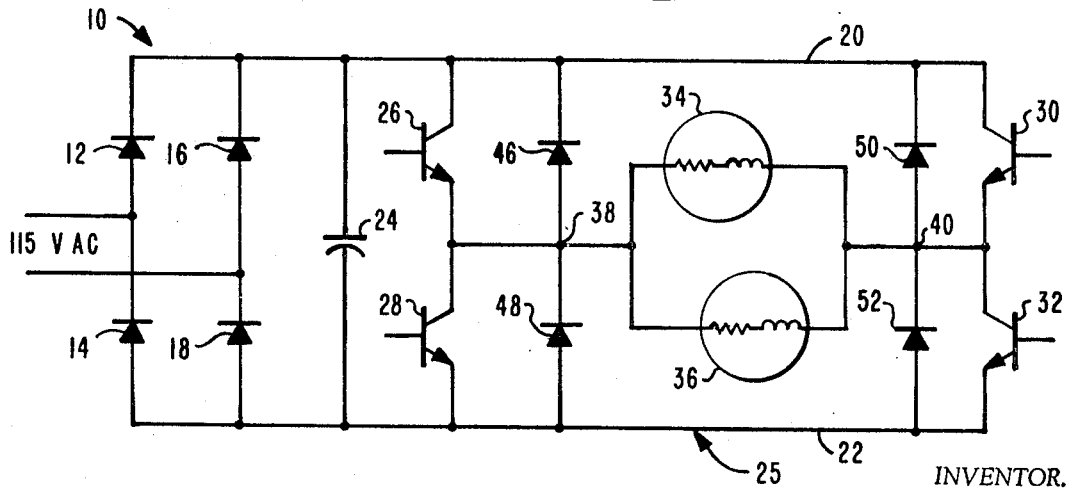
FIG.—4
INVENTOR.
JEFFREY M. BEVIS

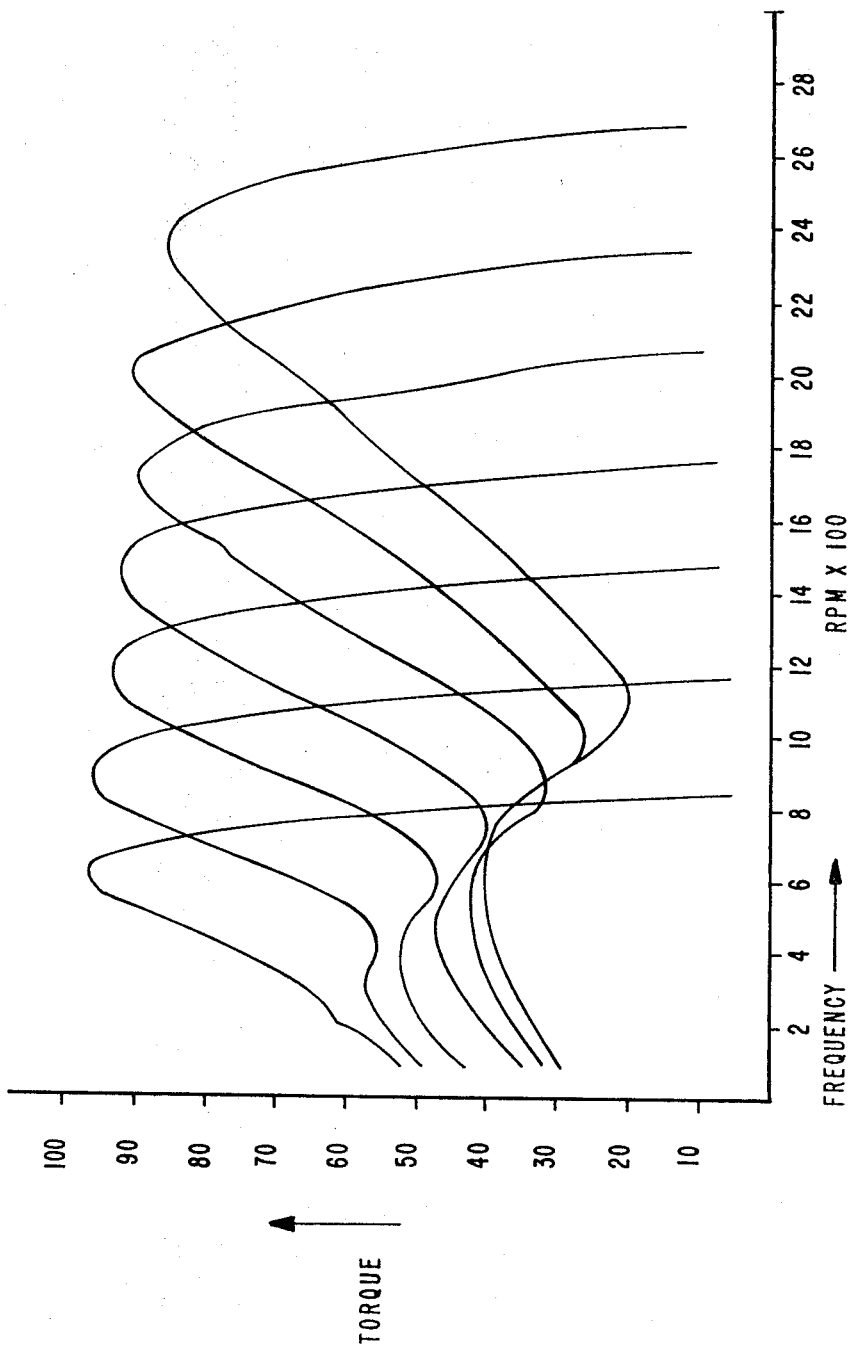
FIG.—3

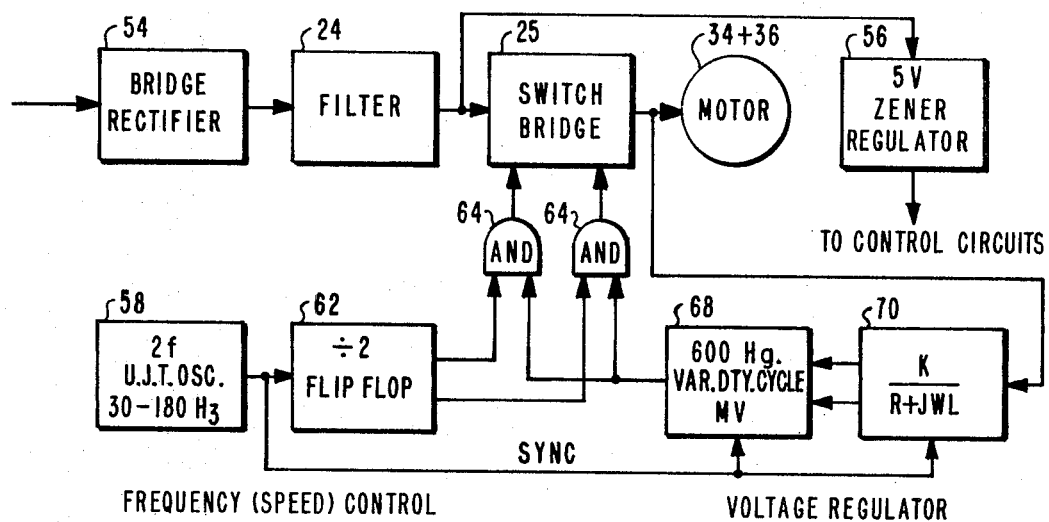
FIG.—5
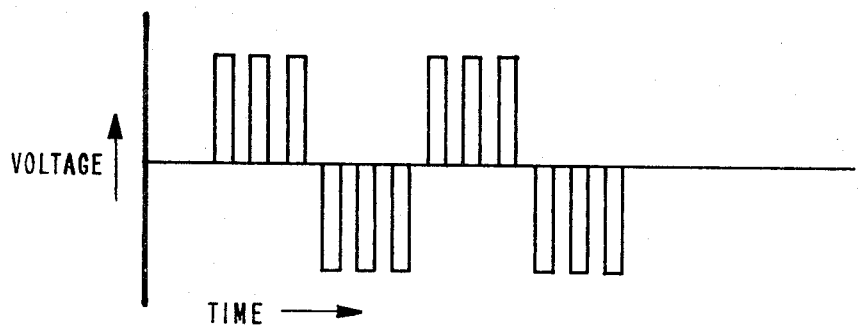
FIG.—7

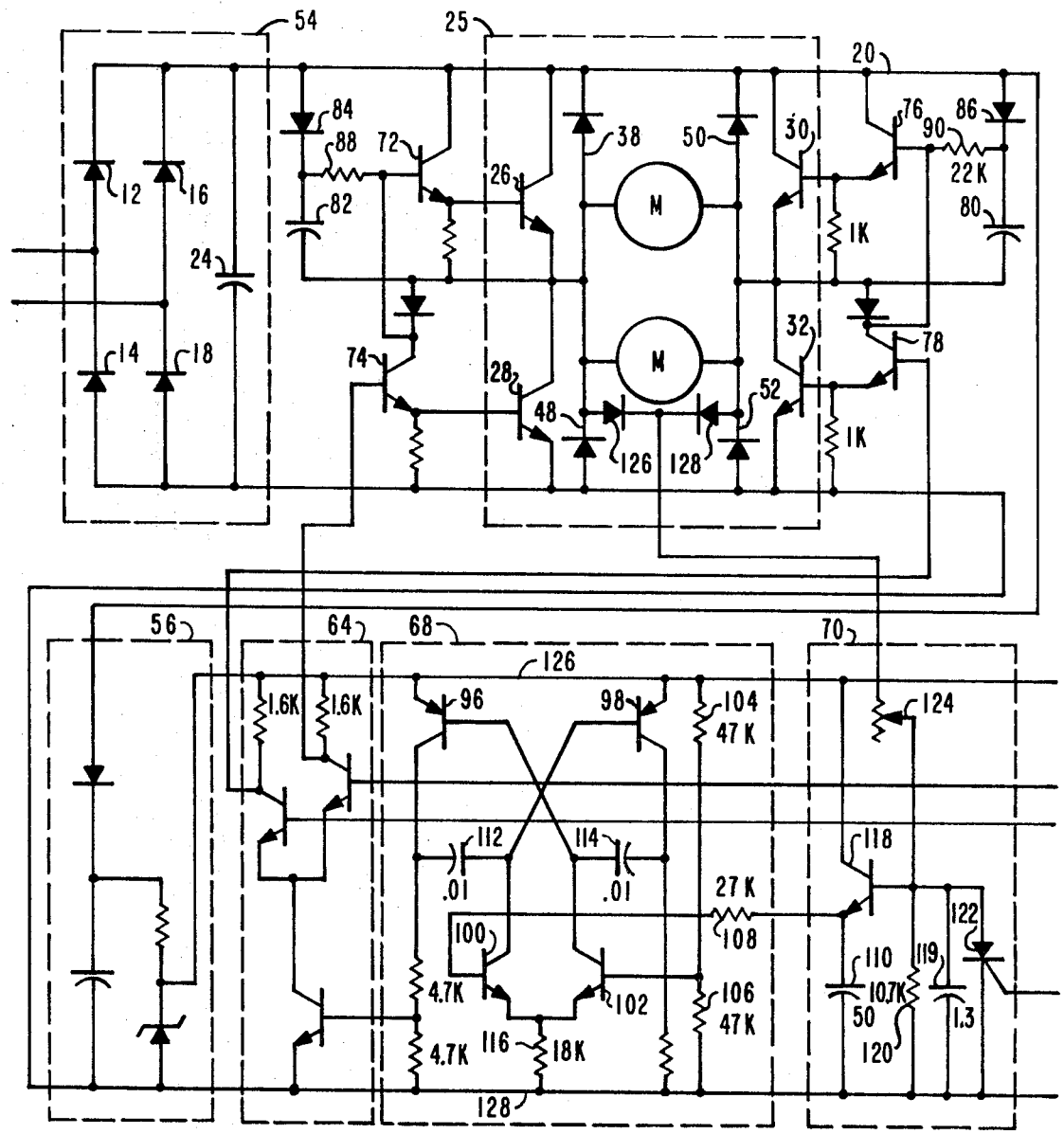
FIG.—6A

INVENTOR.
JEFFREY M. BEVIS
BY
ATTORNEY

# 3,588,650

VARIABLE FREQUENCY MOTOR DRIVE

This invention relates generally to a speed control circuit for AC motors and more particularly to a circuit for controlling the speed of AC motors by controlling the input frequency and voltage to the motor to maintain a constant torque at variable speeds.

BRIEF SUMMARY

There is no uniformity in the frequency of the power supplied to electric equipment throughout the world. Consequently, there is a need for electrical equipment to have a built-in flexibility to enable it to be used in various locations having both different power supply frequencies and voltage levels.

This need is particularly urgent in the case of electrical equipment utilizing electrical motors. This is because the size of the motors used to drive such electrical equipment depends in part on the supply frequency and it is highly desirable to be able to manufacture equipment using motors which can put out the same torque over a widely varying frequency range and voltage level. In this way electrical equipment using standard high production low cost motors can be used in widely varying environments.

In addition, users of motor driven electrical equipment often want to operate the equipment at speeds different from the designed speed and for reasons of economy they want to do this without replacing the motor or using expensive speed multiplying devices with the motor. This is important because it is often difficult to change components, particularly motors in electrical equipment because of size and space limitations which would require the replacing equipment to fit in the same space envelope.

Typically tape readers require one or more electrical motors to drive the tape through the tape reader. However, different customers depending on their geographical location use power sources having different supply voltages and power frequencies. In addition, there is a demand for greater flexibility in the speed of the motor so that the tape reader can be operated at different speeds. Since most motor driven electrical equipment use AC motors such as induction motors for reasons of economy, it would be desirable to be able to attach an efficient control circuit to the motor in order to be able to control the speed of the motor but at the same time keep the torque developed by the motor independent of the supply voltage and frequency.

What is needed therefor, and comprises an important object of this invention, is to provide a practical efficient low cost system for controlling the speed of an AC motor by varying both the frequency and voltage supplied to the motor in such a way that the torque output of the motor remains constant.

An additional object of this invention is to provide a low cost control circuit for an induction motor so that the torque developed in the motor remains independent of line voltage and frequency.

Still another object of this invention is to provide a circuit for electrical equipment for generating any desired frequency and voltage so that electrical equipment can use high production low cost induction motors without using expensive gear trains to control the speed of the motor.

These and other objects of this invention, will become more apparent when understood in the light of the specification and accompanying drawings, wherein:

FIG. 1 discloses the torque speed characteristic of an induction motor showing the change in the torque output of the motor caused by variations in the input voltage to the motor at a constant frequency.

FIG. 2 is a diagram disclosing the torque speed characteristics of an induction motor showing the change in the torque output of an uncontrolled motor when voltage at different frequencies is supplied to it.

FIG. 3 discloses the effect of controlling both the frequency and voltage supplied to the motor to obtain a substantially constant torque output over a wide frequency range.

FIG. 4 is the basic power circuit connected to the motor to be controlled.

FIG. 5 is a diagrammatic representation of the motor drive circuit.

Figure 6B:
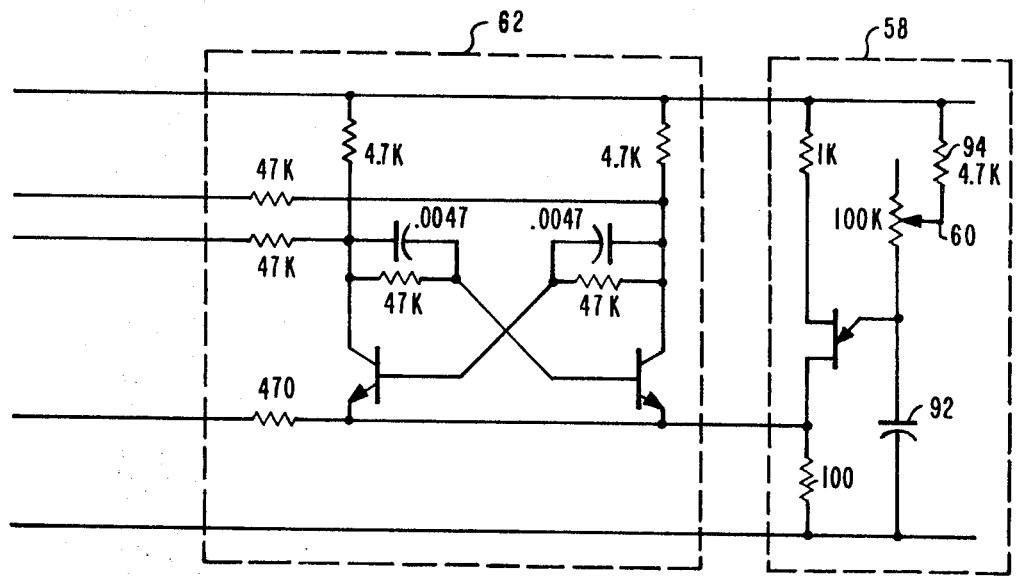

FIGS. 6A and 6B disclose the motor drive circuit embodying the principles of this invention.

FIG. 7 is a representation of the alternating chopped square wave voltage pulse supplied to the motor by the drive circuit.

Figure 8:
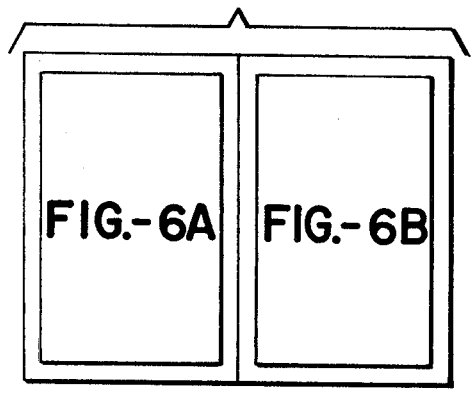

FIG. 8 is a diagrammatic representation showing how the circuits of FIGS. 6A and 6B are connected together.

Referring now to FIG. 2 of the drawing, the performance characteristics of a typical induction motor are shown. It is evident that the speed of the motor changes with the frequency and so frequency variation of the voltage supplied to the motor offers the possibility of controlling the speed of the motor. However, it is also clear that changing the frequency produces a substantial change in the torque output of the motor which would, in many circumstances, be undesirable.

FIG. 1 discloses the performance characteristics of a typical induction motor as effected by changes in the magniture of the input voltage, and it is evident that as the voltage supplied to the motor decreases the torque decreases.

Practical speed control of an AC motor such as an induction motor by means of frequency changes requires the motor to put out substantially constant torque as the frequency changes (see FIG. 3). To do this however, the voltage supplied to the motor must vary with the frequency as shown by a consideration of the diagrams of FIG. 1 and FIG. 2.

To satisfy these requirements, the basic power circuit indicated generally by the reference numeral 10 in FIG. 4 is provided. This circuit utilizes a rectifier bridge composed of diodes 12, 14, 16 and 18 to provide an upper bus 20 which is always positive with respect to the lower bus 22. A capacitor 24 is connected across the busses as shown for reasons to become apparent below. A switch bridge 25 is provided. The bridge comprises NPN transistors 26, 28, 30 and 32 connected between bus lines 20 and 22 as shown, although other solid-state switching devices may be used. If transistors 26 and 32 are turned on while transistors 28 and 30 are turned off, by means of appropriate control circuitry, current would flow from the upper bus 20 through motors 34 and 36 to the lower bus 22 flowing from motor terminals 38 to 40.

If transistors 28 and 30 are on and transistors 26 and 32 are off, the current would flow from bus 20 to bus 22 through the motor terminals 40 to 38 or in the opposite direction. Thus, it can be seen that by providing suitable control circuitry, the transistors 26, 28, 30 and 32 maybe operated in such a way as to provide alternating voltage pulses through the motor at any desired frequency.

If after transistors 26 and 32 are turned on, they are suddenly turned off by some external control circuit, the energy stored in the inductions component of the load in the motor would cause the voltage at terminal 38 to fall and the voltage at terminal 40 to rise in an effort to maintain the current in a status quo to the load. This energy must be utilized in order to prevent problems from unwanted heating in the coils of the motor from arising. To utilize this energy, diodes 46, 48, 50 and 52 are connected in parallel with transistors 26, 28, 30 and 32 as shown. With this arrangement, after transistors 26 and 32 are suddenly turned off, and while transistors 28 and 30 are off, the fall in voltage at terminal 38 causes current to flow through diodes 48 from bus 22 to the load through terminals 38 to 40 and then through diode 50 to bus 20 where it would hit a deadend were it not for the capacitor 24. This capacitor has a dual function in that it helps smooth the rectified voltage pulses and absorbs the inductive energy in the motor.

If, after transistors 26 and 32 are turned off, transistor 28 and 30 are turned on, no current could flow through the on transistors 28 and 30 until the energy in the motor had been transferred to capacitor 24 and the motor current decayed to zero. Only then would current start to flow through transistors 28 and 30 in the opposite direction.

Thus, it can be seen that capacitor 24 is necessary to prevent the bus voltage from rising high enough to cause a breakdown in the transistors or at least generate unwanted heat. With this capacitor arrangement, the energy is stored and returned to the motor on the next half cycle.

The capacitor could be eliminated or reduced to a small value necessary to handle spikes occurring during switching by operating the transistor switches in the following sequence: (1) Transistors 26 and 32 on —current builds up and flows from transistor 26 through the load left to right through transistor 32; (2) Transistors 28 and 32 are on—current decays down to zero and flows through diode 48 through the load left to right through transistor 32; (3) Transistors 28 and 30 are on—current builds up and flows from transistor 30 through the load, right to left, and through transistors 28; (4) Transistors 28 and 32 are on—current decays to zero flowing through the load, right to left, from transistor 32 to transistor 28. The sequence then repeats itself.

The use of the capacitor 24 offers additional advantages in that noise spikes on the line are ameliorated thereby decreasing the voltage rating (and cost) of the transistors. In addition, more energy can be delivered to the load if the capacitors are large enough to maintain peak voltage and the load can be isolated from the influence of power line frequency.

In considering the operation of the control circuit necessary to operate the switch bridge in the above-described sequence at the correct frequency, account must be taken of the characteristics of the induction motor. To begin with the control circuit must not provide a direct current component to the motor because it would in effect cause the motor to behave as a brake and generate heat. Furthermore, it is undesirable for the control circuit to provide a pulse type uniform voltage to the motors of the type where voltage is applied in one direction for a short time and is then reduced to zero for most of a half cycle then is applied in the opposite direction for a short time followed by a long period at zero. This type of voltage would prevent the motor from developing its normal torque.

However, induction motors, despite the fact that they are designed for a sinusoidal voltage input, work well with square wave voltage and also with square wave voltage pulses of the type where the pulses are equally distributed over each half cycle. Therefore, by providing a square wave voltage to the motor and chopping the square voltage wave into pulses the proper average voltage can be supplied to the motor for the particular frequency desired. This is what the control circuit for the switch bridge 25 is designed to do. Furthermore, such an approach has an added bonus in that if the supply voltage changes due to line variations, the duty cycle supplied to the motor can be changed to maintain the proper average voltage.

Referring again to FIG. 4 of the drawing, it is clear that the upper and lower transistors on each side of the load bridge cannot be on simultaneously. However, it is undesirable for them to be off simultaneously because the energy buildup in the coils of the motor would appear in a form of heat as described above. It would be more convenient to drive transistors 28 or 30 and allow these transistors to control transistors 26 and 30.

In particular, circuitry is provided for causing transistor 28 to turn transistor 26 off when the transistor 28 is on or turn transistor 30 off when transistor 32 is on. This is convenient because the commands could be referred to the negative bus 22. However, this requires that once off transistors 26 and 30 must be turned on from another source.

The block diagrams for the drive circuit is shown in FIG. 5. In particular, the power supply is first rectified by the bridge rectifier comprising the diodes 12, 14, 16 and 18 shown in FIG. 4. The rectified voltage is then smoothed by a filter network which in the embodiment shown comprises the capacitor 24. The Zener voltage regulator 56 provides a low voltage source which operates the remaining blocks which generate the commands to the bridge (see FIG. 6). These blocks include a generally conventional unijunction relaxation oscillator 58 which provides a very stable series of very short pulses.

The frequency of this oscillator may be manually adjusted by the potentiometer 60 which is the only operational adjustment in the circuit. The unijunction oscillator operates at twice the desired frequency supplied to the motor. Its output is fed to a generally conventional flip-flop 62 which reverses state on each oscillator pulse, and as shown in FIG. 5, has two square wave outputs, each 180° out of phase with each other. The outputs from the flip-flop are connected through AND gates 64 to the transistors in the switch bridge 25 as shown in FIG. 5.

Ignoring the function of the AND gate for the moment, flip-flop 62 generates a square voltage wave at the motors when first transistors 26 and 32 are on and then transistors 28 and 32 are on. The oscillator flip-flop arrangement insures that each half cycle of the drive frequency is exactly the same as its successor. With this arrangement there is no net DC in the motors which could occur if a single multivibrator were used to generate the square wave.

Each of the flip-flop outputs is ANDed with the single output from a generally conventional variable duty cycle multivibrator 68 which generates the chopping signal necessary for regulating the average voltage to the motor. In the absence of an output signal from the multivibrator 68, the flip-flop commands cannot turn on transistors 26 or 30 and the motor is short-circuited through transistors 28 and 32. Depending on its input the multivibrator 68 may produce an output for any percentage of the time from zero to 100 per cent. It switches at approximately 600 Hertz regardless of the duty cycle.

As stated above, speed control at a constant torque requires that both the frequency of the voltage supplied to the motor be varied along with the magnitude of the average voltage.

This is accomplished by providing that the input signal to the multivibrator be derived from the voltage applied to the motor in a feedback loop through an attenuation network whose transfer function depends upon frequency. The attenuation network 70 is connected to the multivibrator 68 to control the percentage of time the multivibrator produces an output. In this way the width of the chopped voltage pulses during each cycle is automatically controlled to vary the average voltage supplied to the motor. The attenuation network does this in such a way that the torque output of the motor is independent of frequency, as will become apparent below. Thus for a given drive frequency, the closed loop network regulates the average voltage to the motor. It has been found that the transfer function of a frequency sensitive network or attenuator 70 is satisfied to a high degree of accuracy by a network whose impedance is in the form of $K/R+JWL$ where the denominator is the impedance of the motor. This is true even though the impedance of the motor is based on sinusoidal voltage waves whereas the motor receives a square wave. The circuit 70 for providing the required transfer function or attenuation is shown in FIG. 6 outlined by the dotted lines.

As stated above, when the frequency is changed, the regulating level of the average voltage is automatically changed to correspond to the new frequency. This enables the motor to develop the same torque at all frequencies and at different speeds.

Since the multivibrator 68 is in the regulating loop there is a tendency for the 600 Hertz chopping frequency to lock into the drive frequency when they are nearly harmonically related. This would give rise to a slight growling in the motor. To prevent this from happening, the unijunction oscillator pulse is connected to the multivibrator 68 and attenuator 70 (see FIGS. 5 and 6) to synchronize and reset the multivibrator at the beginning of each half cycle or drive frequency. With this arrangement, the chopping is identical for both half cycles and no DC or low frequency AC results.

Referring now to the switch bridge 25 shown in FIG. 6, the main transistors 26, 28, 30 and 32 require a fair amount of drive current. However, the only source of power is the high voltage bus. Obtaining base current for these transistors directly through a resistance dissipates an exorbitant amount of power and hence produces undesirable heating. Consequently, each of the main transistors is driven by an emitter follower comprising transistors 72, 74, 76 and 78 along with appropriate circuitry. These transistors must have the same voltage rating as the main transistors. In this way power dissipation and heat generation is avoided.

Base current for the lower emitter followers 74 and 78 is obtained from the 5 volt bus which is supplied from the high voltage bus. However, there is no such convenient source for the upper emitter followers.

Capacitors 80 and 82 are connected from the motor terminal through diodes 84 and 86. When a motor terminal is switched to the negative bus 22 the capacitors are charged to the voltage of the positive bus. But, when the motor terminals are then switched to the positive bus, the capacitors retain their charge and their positive terminal remains at bus voltage above the motor terminal, or twice the bus voltage above the negative bus.

These capacitors act like batteries in that they supply the emitter follower base through the resistors 88 and 90. So long as the capacitors are not appreciably discharged, the current through the resistors 88 and 90 remains constant throughout the cycle. The time constant of each resistor and associated capacitor must be long enough so that resistor current does not fall below that required by the base during one-half cycle of the drive frequency. Once this time constant has been chosen, it sets the lowest frequency at which the circuit may satisfactorily operate. The manual frequency adjustment must be designed to prevent an operator from choosing a lower frequency. Otherwise the transistors may be overheated when they are on.

When the lower emitter followers 74 and 78 are turned on, their collector pulls the upper base negative until it is clamped by the associated diode. This turns off the upper transistors at the same time emitter current turns on the lower transistors. The lower emitter followers must be driven full on or full off. Otherwise, high power dissipation would occur in these transistors.

In the unijunction oscillator circuit 58 the capacitor 92 and fixed resistor 94 in series with the potentiometer are chosen to set the low and high frequency limits of the motor control. As shown in FIG. 6 the output of the oscillator 58 is directly coupled to the emitter of the flip-flop 62 and the output of the flip-flop is fed directly through the AND gate 64 to the control input of the switch bridge 25 (see FIG. 6).

The variable duty cycle multivibrator 68 includes a pair of PNP transistors 96 and 98 (see FIG. 6). The base resistors of these transistors have been replaced by the collector resistances of an NPN pair of transistors 100 and 102 connected as a differential amplifier. One side of the differential input is connected to a reference voltage obtained from a center tap divider comprising resistances 104 and 106 connected across the 5 volt bus. The other input is connected through the 27K resistor 108 to a large capacitor 110. The voltage across capacitor 110 determines the ratio of charge times of the capacitors 112 and 114 in the multivibrator. The sum of the charge times and hence the frequency of the multivibrator set by the emitter resistor 116 of the differential amplifier. The large capacitor 110 which supplies the input to the differential is charged through an emitter follower 118. Since capacitor 110 is discharged only by the small base current to the differential, it and the emitter follower 118 serve as a peak detector.

The emitter follower signal is a saw tooth developed across a capacitor 119 and resistance 120 which are connected in parallel. At the beginning of each half cycle of the drive frequency, an SCR 122 triggered by the unijunction oscillator 58 resets the voltage on capacitor 118 to zero.

If a constant current is fed into the RC combination the voltage on capacitor 118 will rise until it is momentarily reduced to zero by the SCR. The current to the RC network is supplied through a high resistor connected through a pair of diodes to the motor terminals. When a motor terminal is high its voltage is virtually the positive supply voltage. If this voltage changes, the current of the RC network changes correspondingly which changes the peak of the saw tooth proportionately.

Because the motor voltage is chopped, neither motor terminal is high for some percentage of the cycle. At such time the current to the RC network is zero. The average current is a direct measure of the average motor voltage taking into account both the amplitude and duty cycle of the motor voltage. In order to optimize the voltage for a particular frequency while maintaining a constant torque in the motor, the voltage across the RC network should be directly proportional to the current in the motor.

The current through the motor $I_m$ looking at the motor as a resistance and inductance series, is, for a close approximation $$E_m = i_m R_m + \frac{L_m di_m}{dt} \quad (1)$$

Where $R_m$ and $L_m$ are the motor resistance and inductance, and $E_m$ is the voltage supplied to the motor. In the feedback loop $$E_m = k_i I \quad (2)$$

where $I$ is the current through resistor 124 which has a resistance $K$. However, the voltage across the RC network in the attenuator 70 is $$\frac{E_m}{k_i} = I = \frac{e}{R} + C\frac{de}{dt} \quad (3)$$

or $$E_m = \frac{k_i e}{R} + k_i C \frac{de}{dt} \quad (4)$$

It is clear that equation (3) is similar to equation (1) in form and the network is therefore of the right form to compensate the motor for changes in voltage required by changes in frequency.

In particular, since the voltage across the motor is a function of frequency and should increase as the frequency increases to maintain the motor torque constant, attenuator is set up so the attenuation ratio $V_o/V_i$ decreases as the frequency increases. In this way the amount of feedback to the motor decreases as the frequency increases whereby the output voltage increases.

To determine the correct values of R and C in the attenuator 70, an unchopped square wave is applied to the motor and the voltage level is measured at each of several frequencies which would produce the same maximum torque as a 60 Hertz 115 volt sine wave.

For a 60 Hertz square wave on a typical motor the voltage would be 130 volts. Therefore knowing the characteristics of the motor, $R=111$ and $wL=192$ for the typical motor, $$E_{60} = K(111+j192) = K221 \; \underline{60°} = 130 \quad (5)$$

From this K may be determined; K equals 130/221
At zero frequency $$E_o = K(111) = \frac{130}{221} \times 111 = 65 \text{ volts} \quad (6)$$

Hence the motor voltage should be 65 volts when the voltage across the RC network is 2.5 volts and the capacitor is in effective as at zero frequency (see the center tap terminal 125 at the voltage divider between the 5 volts bus 126 and the zero volt bus 128).

Since the voltage across the network is a known function of the resistance and capacitance, and since all the other factors are known, R or C may be chosen arbitrarily and the other factor will be determined. In particular a good choice would be choosing C equal to 1.30 μf, resistance 120 equal to 10.7 K and resistance 124 equal to 268 K.

Finally with the motor controlled by the regulator the torque output of the motor remains constant as the frequency, and hence the speed of the motor, is changed, see FIG. 3. This provides a convenient way to control the speed of the motor regardless of the magnitude and frequency of the line voltage.

Under some circumstances, where the frequency range to be fed into the motor is rather limited, the reactive portion of attenuation network 70 may be eliminated and the control circuit described above may function as a frequency generator to supply the motor with the narrow frequency range without regard to the variations in torque, since over a narrow frequency range the change in torque may be tolerable without any voltage adjustment.

I claim:

1. A variable frequency motor drive comprising a power source, a rectifier connected to the power source to provide an upper bus and a lower bus wherein the upper bus is always positive with respect to the lower bus, a switch bridge connected between said upper and lower busses, said switch bridge comprising two pairs of solid-state switching devices, the solid-state switching device in each pair connected in series between the upper bus and the lower bus, said motor drive adapted to have a AC motor connected thereto wherein one terminal of said AC motor is adapted to be connected between the junction between one pair of solid-state switching devices and the other terminal of said AC motor is adapted to be connected between the junction between the other pair of solid-state switching devices, and a control circuit including a square wave generator connected to said pairs of solid-state switching devices to turn them on and off at any desired frequency, means in said control circuit for chopping each half cycle of the square wave, and a frequency sensitive attenuator network in said control circuit connected to said chopping means for controlling the chopping rate of the square wave so that the motor receives alternating chopped square wave voltage pulses at the average voltage required to keep the torque output of the motor substantially independent of the motor drive frequency.

2. A variable frequency motor drive of the class described comprising a power source, a rectifier connected to the power source to provide an upper bus and a lower bus wherein the upper bus is always positive with respect to the lower bus, a switch bridge connected between said upper and lower buses, said switch bridge comprising two pairs of transistors, a transistor in each pair connected in series in such a way that the emitter of one transistor in a pair is connected to the lower bus and the collector of one transistor is connected to the emitter of the remaining transistor in said pair while the collector of the remaining transistor is connected to said upper bus, said motor drive adapted to have an AC motor connected thereto wherein one terminal of said one motor is adapted to be connected between the junction of the collector and emitter of the transistors of one pair of transistors and the other terminal of the motor adapted to be connected between the junction of the collector and emitter of the transistors of the remaining pair of transistors and a control circuit connected to said pairs of transistors to turn them on and off at any desired frequency and in such a way that the motor receives alternating chopped square wave voltage pulses at a frequency which produces the motor speed desired and at an average voltage required to keep the torque output of the motor substantially independent of the motor drive frequency, said control circuit including a unijunction oscillator connected to a flip-flop circuit to provide two square wave voltage outputs 180° apart with each half cycle exactly the same in form to eliminate any DC component in the voltage supplied to the motor, a high frequency variable duty cycle multivibrator connected to said switch through an AND gate along with the output of said flip-flop circuit in such a way that the outputs of the flip-flop circuit cannot operate a transistor in said switch bridge unless there is an output signal pulse from the multivibrator whereby the square wave output signals from the flip-flop are chopped to provide chopped square wave voltage pulses to the motor, and an attenuation circuit connected to said variable duty multivibrator in said motor and a feedback circuit to control the percentage of time the multivibrator produces an output whereby the width of the chopped voltage pulses during each cycle is automatically controlled to vary the average voltage supplied to the motor in such a way that the torque output of the motor is independent of the frequency.

3. The variable frequency motor drive described in Claim 2 wherein said attenuation circuit includes a resistance and a capacitance connected together in such a way that the attenuation circuit has an impedance of the form $K/(R+jwL)$ where R and L are chosen to correspond to the resistance and inductance in the coils of the motor whereby the denominator of the expression is the impedance of the motor.